US005340430A

United States Patent [19]

Pfuhl

[11] Patent Number: 5,340,430

[45] Date of Patent: Aug. 23, 1994

[54] SYSTEM FOR HANDLING A WASTE WEB OF A WEB LAMINATE

[75] Inventor: Reiner Pfuhl, Dieburg, Fed. Rep. of Germany

[73] Assignee: Maschinenfabrik Goebel GmbH, Darmstadt, Fed. Rep. of Germany

[21] Appl. No.: 856,202

[22] PCT Filed: Sep. 26, 1991

[86] PCT No.: PCT/DE91/00764

§ 371 Date: May 13, 1992

§ 102(e) Date: May 13, 1992

[87] PCT Pub. No.: WO92/06839

PCT Pub. Date: Apr. 30, 1992

[30] Foreign Application Priority Data

Oct. 12, 1990 [DE] Fed. Rep. of Germany ....... 4032394

[51] Int. Cl.[5] .............................................. B32B 35/00

[52] U.S. Cl. .................................... 156/344; 156/267; 156/268; 156/183; 156/584; 226/5; 226/96; 271/311

[58] Field of Search ............... 156/267, 268, 269, 183, 156/584, 344; 226/96, 5; 271/311

[56] References Cited

U.S. PATENT DOCUMENTS

| | | | |
|---|---|---|---|
| Re. 29,644 | 5/1978 | Simpson | 156/515 X |
| 1,628,515 | 5/1927 | Rowe | 156/183 |
| 1,782,767 | 3/1929 | Rowe | 156/183 |
| 2,161,092 | 6/1939 | Rowe | 156/183 |
| 2,658,427 | 11/1953 | Ver Doot | 361/214 X |
| 3,266,406 | 8/1966 | Stievenart | 271/311 X |
| 3,681,178 | 8/1972 | Marguiles | 156/268 X |
| 4,246,058 | 1/1981 | Reed | 156/268 X |
| 4,273,606 | 6/1981 | Trilli | 156/267 X |
| 4,809,602 | 3/1989 | Wheeler | 156/267 X |
| 4,995,933 | 2/1991 | Brussel | 156/344 X |

OTHER PUBLICATIONS

Skewed Blade Stripper, Xerox Disclosure Journal, James J. Knieser, pp. 85-86, Nov. 1977.

*Primary Examiner*—David A. Simmons
*Assistant Examiner*—Charles Rainwater
*Attorney, Agent, or Firm*—Watson, Cole, Grindle & Watson

[57] ABSTRACT

A system for handling a waste web initially forming a label web adhesively bonded to a carrier web which together comprise a web laminate. The waste web, having its undersurface adhesively coated, results upon the formation of labels from the label web such that the carrier web supports the labels. The system includes a separating roll for causing the carrier and waste webs of the laminate to travel along separate paths. The machine has a web treating roll about which the waste web passes in adhereing contact therewith, and a doctor blade removes the waste web from the treating roll as waste material.

3 Claims, 1 Drawing Sheet

SYSTEM FOR HANDLING A WASTE WEB OF A WEB LAMINATE

BACKGROUND OF THE INVENTION

This invention generally relates to the handling of a waste or residual web initially forming a label web adhesively bonded to a carrier web and together comprising a web laminate, the waste web resulting upon the formation of labels from the label web such that the carrier web supports the labels. The laminate proceeds through a machine having a separating roll for causing the label supported carrier web and the waste web to respectively travel along different paths.

Such web laminates are used to produce labels or the like in a simple and economical manner. The term "labels" is used to describe a plurality of small sheets or web segments which, following a suitable lettering or printing operation, can be adhesively bonded to a carrier web. The labels can represent, for example, a detailed listing of products or ingredients contained in a package or liquid container or can be used as address labels for envelopes. The term "labels" is, therefore, a collective term for a plurality of products, and the term referred to herein is used in its broadest sense.

U.S. Pat. No. 4,849,043 discloses a method of producing labels from a web laminate which consists of a label web adhesively bonded to a carrier web. The laminate passes through a die-cutting station where all the layers thereof other than the carrier layer are diecut to form a succession of spaced labels on the carrier web. The waste web remnants consisting of portions of the label web outside the diecut labels is removed from the web and wound up on a roll. The carrier web containing the labels adhesively bonded thereto proceed through a further processing operation which may include printing or stamping of the labels. Otherwise, the labels can be imprinted or stamped before the label web is diecut to form the labels.

Following removal of the waste web from the carrier web, the waste web has a plurality of openings corresponding to the labels which remain bonded to the carrier. The residual web is therefore often referred to as a lattice web.

The carrier web supporting the labels bonded thereto is usually separated from the waste web using a separating roll causing the waste and carrier webs to proceed along different paths following the separating operation.

The residual web, with its undersurface adhesively coated, is usually wound up into a roll, as disclosed in the U.S. Pat. No. 4,849,043, so that it can be thereafter removed following the winding operation. However, in order to remove the wound residual roll it is necessary to stop the machine thereby involving the machine downtime which is costly. To avoid this production loss, several rewind stations could be provided for rewinding the waste webs, although such an arrangement becomes relatively complicated and expensive.

SUMMARY OF THE INVENTION

It is therefore an object of the present invention to provide a simple and economical system for handling a waste web which permits the waste web to be removed from the machine without interrupting the operation of the label producing process.

The present handling system relates to a waste web which initially forms a label web adhesively bonded to a carrier web and together forming a web laminate. The waste web, with its undersurface adhesively coated, results upon the formation of labels from the label web such that the carrier web supports the labels. The web laminate passes through a machine which includes a separating roll about which the laminate travels for causing the carrier web with the labels supported thereon to travel along one path and for causing the waste web to travel along another path. The machine has a web treating roll about which the waste web passes with its coated undersurface in contact with such treating roll.

A doctor knife or the like is located in the path of travel of the waste web for removing the waste web from the treating roll as waste material.

With such system the waste web can be reduced into small pieces or into a small volume and conveniently collected such that the waste web can be removed in a simple and convenient manner from the machine without requiring a large waste web volume to be handled while avoding any machine downtime such that the machine is capable of continuous operation during the waste removal and collection process.

Other objects, advantages and novel features of the invention will become more apparent from the following detailed description of the invention.

DETAILED DESCRIPTION OF THE INVENTION

Figure 1:
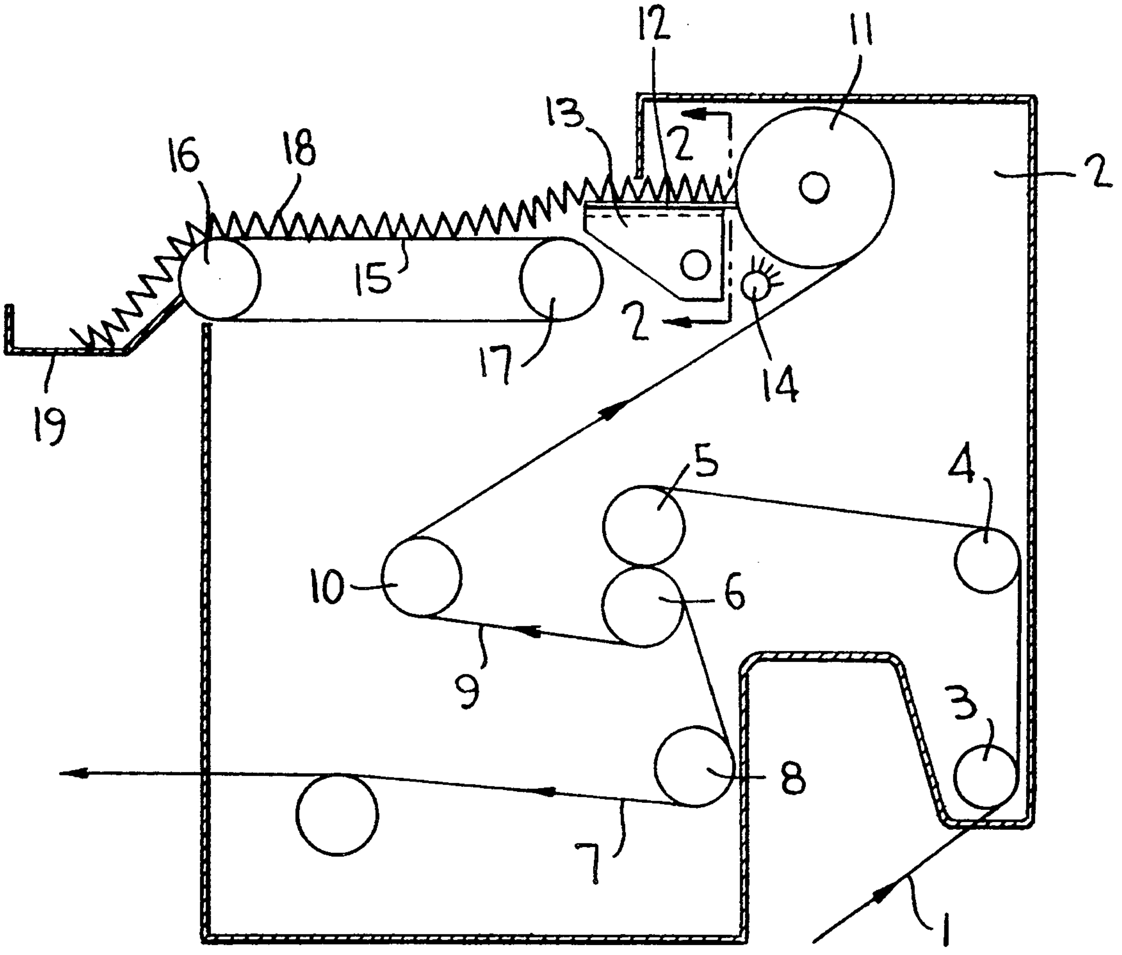
FIG. 1 is a schematic side elevational view of a machine which incorporates the present invention.

In FIG. 1 those elements of the machine that are known to one having ordinary skill in this art and that are not essential to the present invention are not shown for the sake of clarity, rather only those elements are illustrated for a detailed explanation of the invention and its advantages.

A web laminate 1 comprising at least a carrier web and an overlying label web adhesively bonded thereto travels from a machine (not shown) producing the web laminate or from an unrolling operation, and travels about guide rolls 3, 4 and 5 rotatably mounted on machine frame 2 in a known manner. The web laminate travels about a separating roll 6 mounted on machine 2, which separating roll can be driven for conveying the web laminate through the machine.

After looping around separating roll 6 the webs forming web laminate 1 are diverted into different paths of travel. Thus, carrier web 7 of the web laminate is guided by a means of guide roll 8 along the separate path, and the waste or residual web 9 of the web laminate is guided by means of a guide roll 10 along another different path, as shown by the several arrows in FIG. 1.

As aforedescribed, the web laminate comprises a label web adhesively bonded to the carrier web 7, and the waste web 9, with its undersurface adhesively coated, results upon the formation of labels from the label web such that the carrier webs supports the labels formed during a suitable diecut operation or the like carried out on the web laminate prior to entering machine 2. By suitably designing the diecut or punching tool, the label web is divided in such a manner to form labels such that the residue of the label web outside the label portions becomes a waste web.

Since the labels so formed adhere to the carrier web and during the separating operation of the carrier and waste webs no additional forces are exerted on the labels, the labels remain after this separating operation on the carrier web and travel together therewith along its separate path.

At least one of the two sides of the labels is provided with an adhesive coating. Not until the labels are later detached or removed, as by hand, from the carrier web can these labels be separated from the carrier web so as to be applied in known manner to a package or a container or other product by means of the adhesive coat thereon.

After looping around guide roller 10, only waste web 9 travels about a treating roll 11 looping partially therearound and remaining temporarily bonded to it since the undersurface of web 9 is adhesively coated. As shown in FIG. 1, web 9 is not rolled up on treating roll 11 such that a portion of roll 11 always remains free of the waste web.

Figure 2:
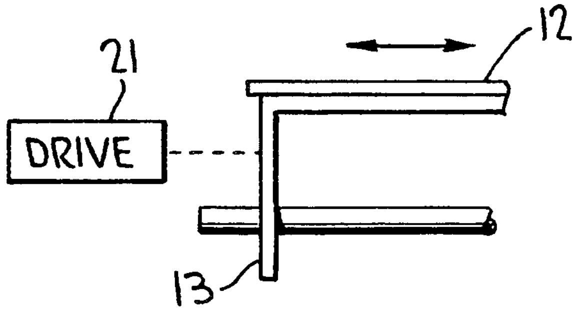
FIG. 2 is a detail view taken substantially along the line 2—2 of FIG. 1.

A knife-like doctor blade 12 is supported on a holder 13 mounted on the frame of machine 2, the blade being set relative to roll 11. The blade can can be removably mounted on its holder 13 and suitably adjused toward and away from roll 11. And, the blade and its holder can be mounted for reciprocation parallel to the axis of roll 11 for reciprocation as shown by the double arrow in FIG. 2. Some suitable drive such as 21 shown in FIG. 2 can be provided for effecting such reciprocation relative to the circumference of roll 11.

Beneath the doctor blade and at an area of roll 11 not looped by web 9, a sprayer 14 is mounted on the machine and includes spray nozzles distributed over the entire length of roll 11, i.e., over the entire width of waste web 9, for spraying a liquid onto the surface of roll 11. Depending on the type of adhesive coated on the undersurface of web 9, this liquid can be water or a solvent for loosening web 9 as it loops around roll 11 to thereby reduce the adherence of web 9 to roll 11 to assist in the doctor blade removing the waste web from roll 11 during the doctoring operation.

The circumference of roll 11 may have such an adhesive strength that waste web 9 remains adhered to it and can even be conveyed by roll 11 and can travel with it to that point at which the cutting edge of doctor 12 is directed toward the circumference of roll 11. At this point the waste web is essentially separated, cut into pieces by the action of doctor blade 12, lifted off roll 11, placed into zigzag folds as shown, whereupon the pushed together portions of the waste web are cemented reciprocally on top of one another, collected and removed in a unique manner from the machine so that the residue of the waste web proceeds along the upper surface of doctor blade 12.

Thus, as the machine continues to operate including that of roll 11 the waste web is removed from roll 11 and conveyed out of the machine such as by a conveyor belt 15. This conveyor belt loops about rolls 16 and 17 and conveys the remains of waste material 18 of waste web 9 into a waste container 19. Guide rolls 16 and 17 and conveyor belt 15 can be efficiently rotated on that side of doctor blade 12 that faces away from roll 11, for example, below doctor blade 12, in the machine such that the arrangement is rotated at right angles relative to that shown in FIG. 1, i.e., waste material 18 formed after waste web removal travels out of the machine in a direction of view of the observer of FIG. 1.

Since the cutting edge of the doctor blade is sharp as a knife, the surface of roll 11 be made hard, or the surface of roll 11 may be hardened using, for example, a chromium plating or other desirable cladding.

All the aforedescribed rolls mounted on the machine can be driven, if necessary, in a known manner. And, instead of sprayer 14, other devices can be provided that loosen the adhesion between the waste web and roll 11, without departing from the invention.

Obviously, many other modifications and variations of the present invention are made possible in the light of the above teachings. It is therefore to be understood that the scope of the appended claims the invention may be practiced otherwise than as specifically described.

What is claimed is:

1. A system for handling a waste web initially forming a label web adhesively bonded to a carrier web and together comprising a web laminate, the waste web, having its undersurface adhesively coated, resulting upon the formation of labels from the label web such that the carrier web supports the labels, the system comprising a machine including a separating roll about which the laminate travels for causing the carrier web with the labels supported thereon to travel along one predetermined path and for causing the waste web to travel along a second predetermined path, a web treating roll mounted on the machine about which only the waste web partially passes without being rolled up thereon so that a portion of said treating roll always remains free of the waste web, the coated undersurface of the waste web being in contact with said treating roll when partially passing thereabout, doctor blade means on the machine in said second path for removing the waste web from the treating roll as waste material and for directing the removed waste web out of the machine, and means on the machine for liquid spraying only said portion of the treating roll without spraying the waste web for assisting in freeing the waste web from the treating roll to thereby aid in the removal of the waste web by said doctor blade means.

2. The system according to claim 1, wherein said doctor blade means includes a doctor blade capable of reciprocation in a direction parallel to the axis of said treating roll.

3. The system according to claim 1, further comprising means on the machine for conveying the waste material outwardly of the machine.

* * * * *